United States Patent
Kismarton et al.

(10) Patent No.: US 10,207,789 B2
(45) Date of Patent: Feb. 19, 2019

(54) AIRCRAFT COMPOSITE WINGBOX INTEGRATION

(71) Applicant: The Boeing Company, Chicago, IL (US)

(72) Inventors: Max U. Kismarton, Renton, WA (US); Clayton L. Munk, Maple Valley, WA (US)

(73) Assignee: The Boeing Company, Chicago, IL (US)

( * ) Notice: Subject to any disclaimer, the term of this patent is extended or adjusted under 35 U.S.C. 154(b) by 209 days.

(21) Appl. No.: 15/238,250

(22) Filed: Aug. 16, 2016

(65) Prior Publication Data

US 2018/0050787 A1    Feb. 22, 2018

(51) Int. Cl.
| | |
|---|---|
| *B64C 3/18* | (2006.01) |
| *B64C 3/26* | (2006.01) |
| *B64F 5/00* | (2017.01) |
| *B29D 99/00* | (2010.01) |
| *B29C 70/00* | (2006.01) |
| *B64C 1/26* | (2006.01) |
| *B29L 31/30* | (2006.01) |

(52) U.S. Cl.
CPC ............ *B64C 3/182* (2013.01); *B29C 70/00* (2013.01); *B29D 99/0014* (2013.01); *B64C 1/26* (2013.01); *B64C 3/26* (2013.01); *B64F 5/0009* (2013.01); *B29L 2031/3085* (2013.01)

(58) Field of Classification Search
CPC .......... B64C 3/182; B64C 3/26; B64C 1/064; B64C 1/06; B64F 5/00
See application file for complete search history.

(56) References Cited

U.S. PATENT DOCUMENTS 3,002,717 A    10/1961  John
3,078,911 A    2/1963   Prewitt et al.
(Continued)

FOREIGN PATENT DOCUMENTS

EP    2799220 A1    11/2014

OTHER PUBLICATIONS

European Search Report—Application 17185973.9-1010, dated Jan. 26, 2018.

*Primary Examiner* — Philip J Bonzell
(74) *Attorney, Agent, or Firm* — Duft & Bornsen, PC

(57) ABSTRACT

Systems and methods are provided for integrating structural components of a wing box. One embodiment is a system that includes outboard planked stringers within an outboard section of a wing box and are co-cured with composite skin at the outboard section. Each outboard planked stringer of the outboard section includes planar layers of Carbon Fiber Reinforced Polymer (CFRP) that are parallel with the composite skin at the outboard section, have fiber orientations aligned to bear tension and compression applied to the wing box, and each extend a different distance along the composite skin at the outboard section. The system also includes center planked stringers within the center section and are co-cured with composite skin at the center section. Each center planked stringer of the center section includes planar layers of CFRP that are parallel with the composite skin at the center section, have fiber orientations aligned to bear tension and compression applied to the wing box, and each extend a different distance along the skin at the center section.

20 Claims, 14 Drawing Sheets

(56) References Cited

U.S. PATENT DOCUMENTS

| | | | |
|---|---|---|---|
| 4,606,961 A * | 8/1986 | Munsen | B29C 70/08 428/105 |
| 4,662,587 A | 5/1987 | Whitener | |
| 4,741,943 A | 5/1988 | Hunt | |
| 6,237,873 B1 | 5/2001 | Amaoka et al. | |
| 7,806,367 B2 | 10/2010 | Lopez et al. | |
| 7,837,148 B2 | 11/2010 | Kismarton et al. | |
| 7,851,040 B2 | 12/2010 | Victorazzo | |
| 7,922,454 B1 | 4/2011 | Riddell | |
| 8,157,213 B2 | 4/2012 | Escobar et al. | |
| 8,215,584 B2 * | 7/2012 | Cazeneuve | B64C 1/064 244/131 |
| 8,257,048 B2 | 9/2012 | Yarbrough | |
| 8,684,311 B2 * | 4/2014 | Nordman | B64C 1/26 244/131 |
| 8,915,471 B2 * | 12/2014 | Nordman | B64C 1/26 244/131 |
| 9,463,866 B2 * | 10/2016 | Cruz Dominguez | B64C 1/064 |
| 2005/0247818 A1 | 11/2005 | Prichard et al. | |
| 2009/0084899 A1 | 4/2009 | Kismarton et al. | |
| 2009/0294591 A1 | 12/2009 | Blanco et al. | |
| 2010/0170985 A1 * | 7/2010 | Flood | B29C 70/30 244/117 R |
| 2010/0178453 A1 * | 7/2010 | Wood | B29C 70/30 428/119 |
| 2010/0230541 A1 | 9/2010 | Benavides et al. | |
| 2011/0293432 A1 | 12/2011 | Hibbard et al. | |
| 2012/0064277 A1 | 3/2012 | Fernandez et al. | |
| 2012/0100343 A1 | 4/2012 | Borghini-Lilli et al. | |
| 2012/0104170 A1 * | 5/2012 | Gallant | B64C 1/061 244/132 |
| 2013/0233973 A1 * | 9/2013 | Nordman | B64C 1/26 244/131 |
| 2014/0145032 A1 | 5/2014 | Moselage | |
| 2014/0161512 A1 * | 6/2014 | Nordman | B64C 1/26 403/267 |
| 2015/0246718 A1 | 9/2015 | Aitken et al. | |
| 2015/0353181 A1 * | 12/2015 | Cruz Dominguez | B64C 1/064 244/119 |
| 2016/0176500 A1 | 6/2016 | Ross et al. | |
| 2016/0207607 A1 | 7/2016 | Charles et al. | |
| 2017/0008611 A1 | 1/2017 | Murta et al. | |
| 2017/0029137 A1 | 2/2017 | Aitken et al. | |

* cited by examiner

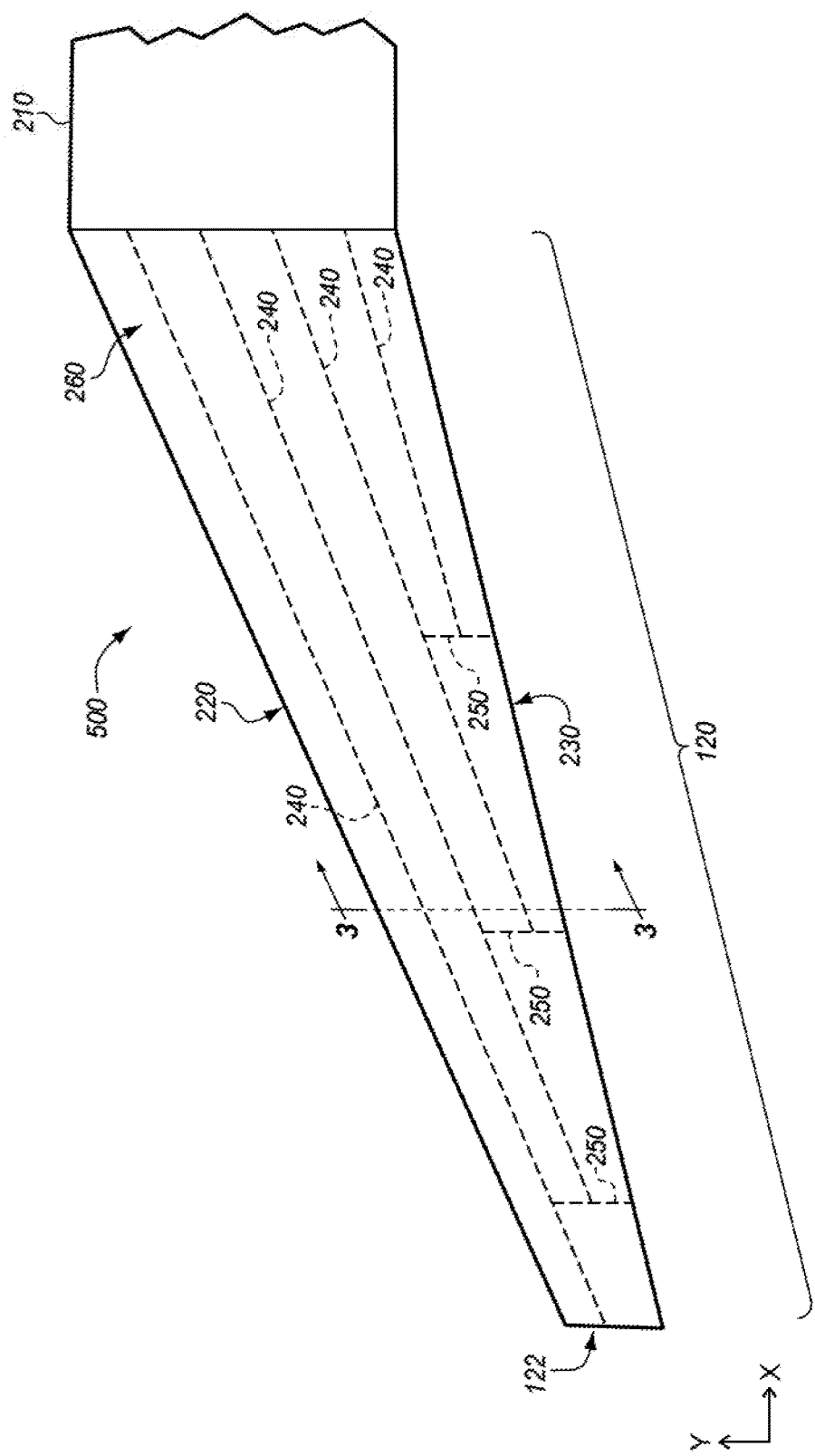

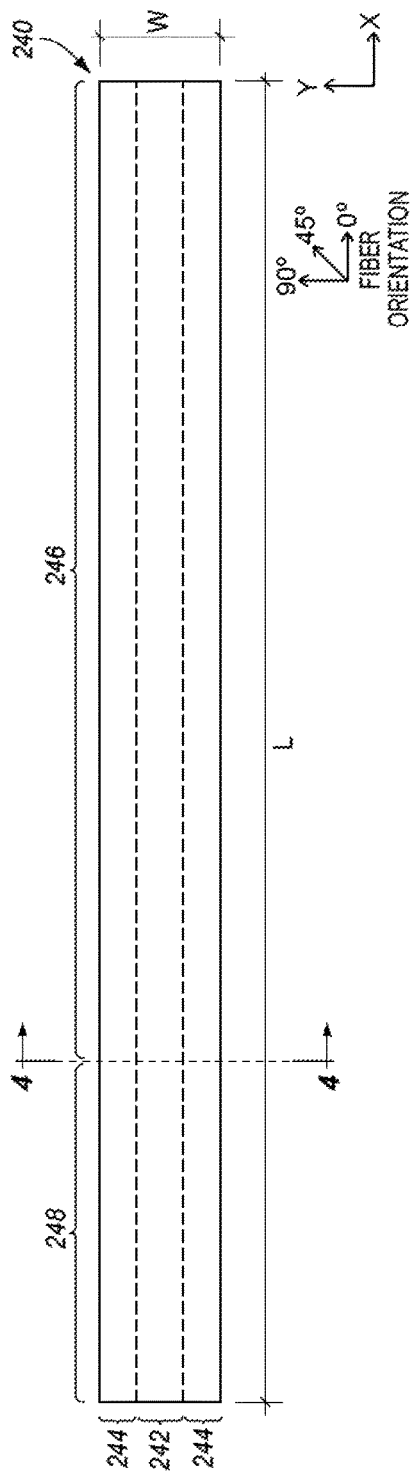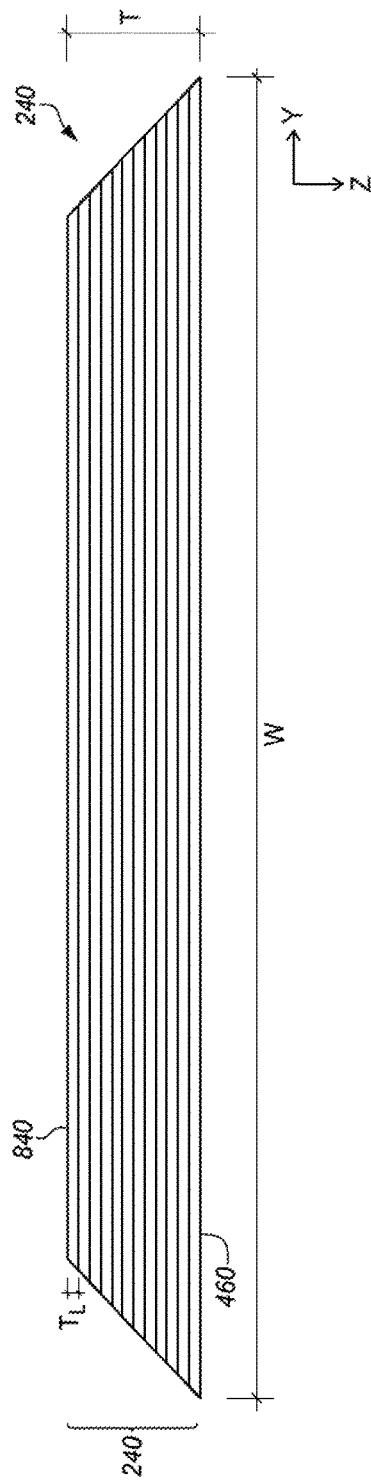

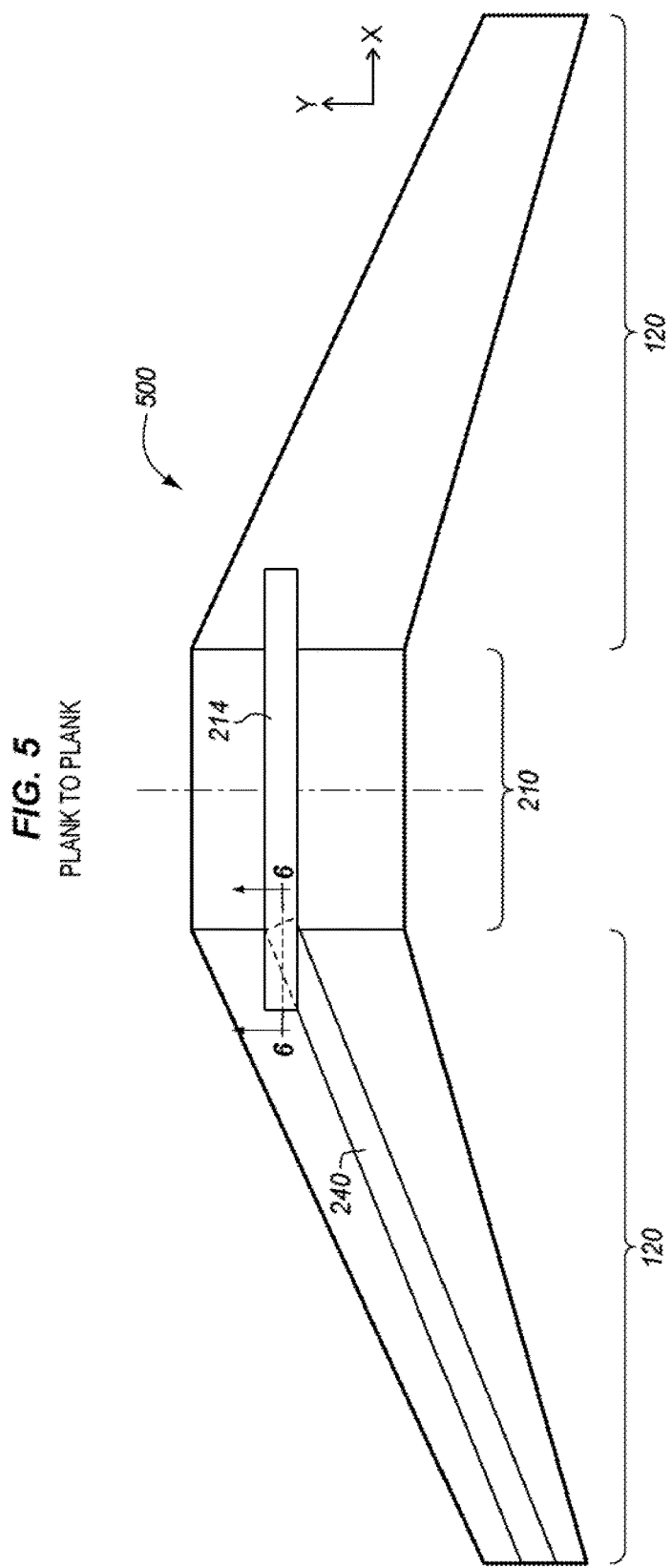

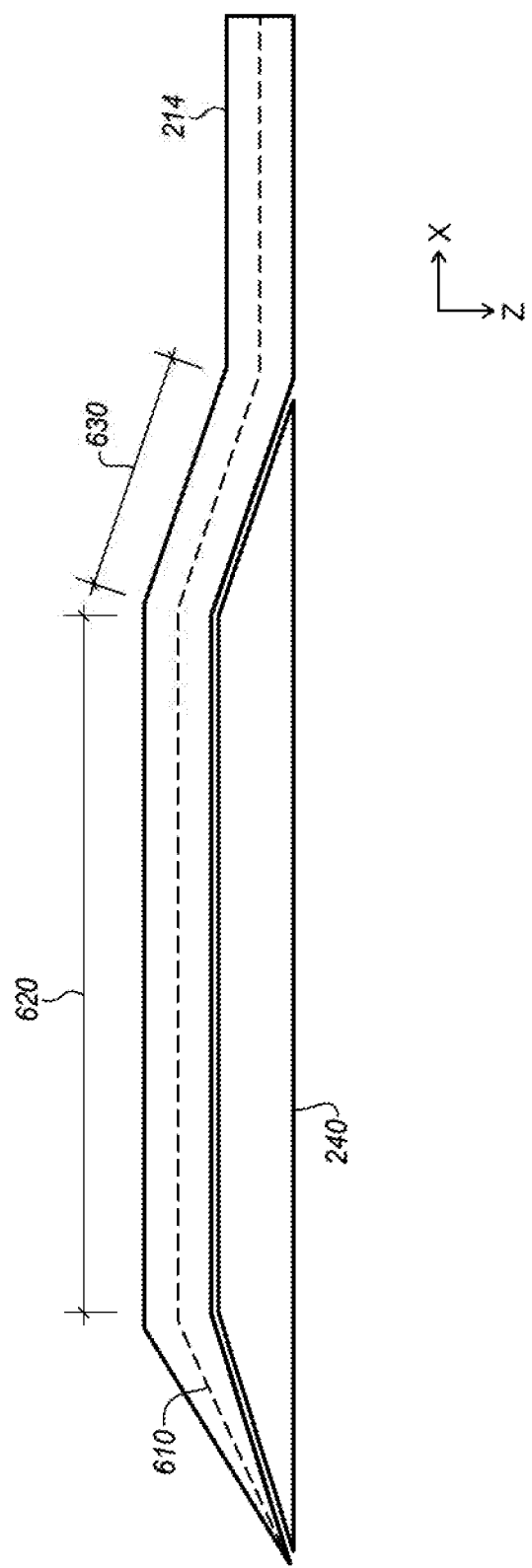

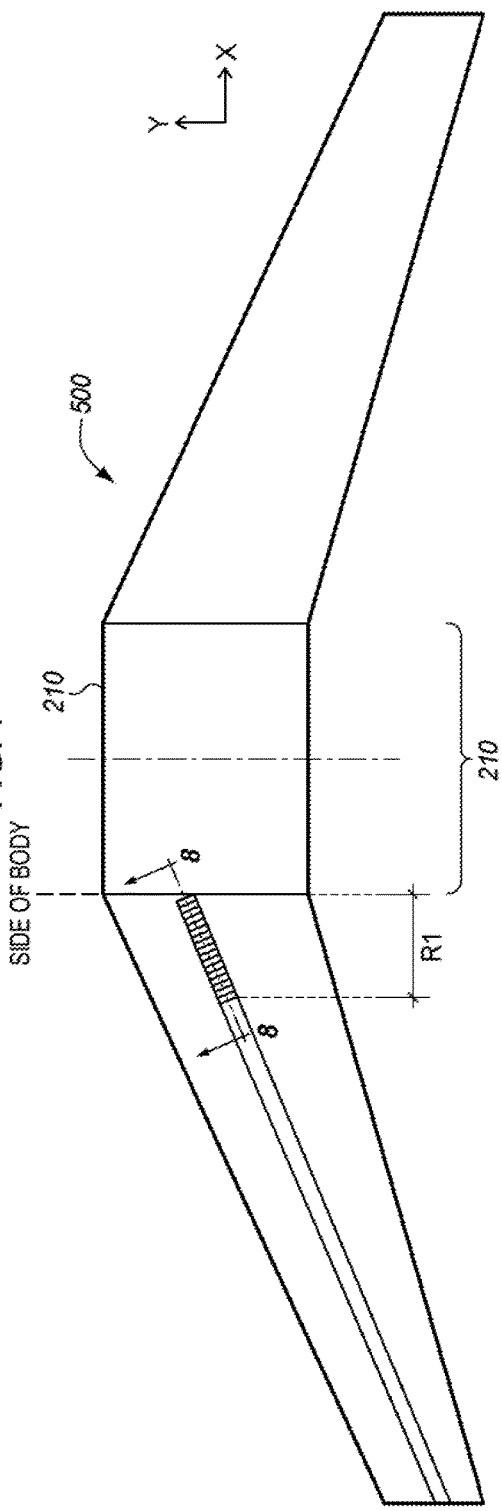
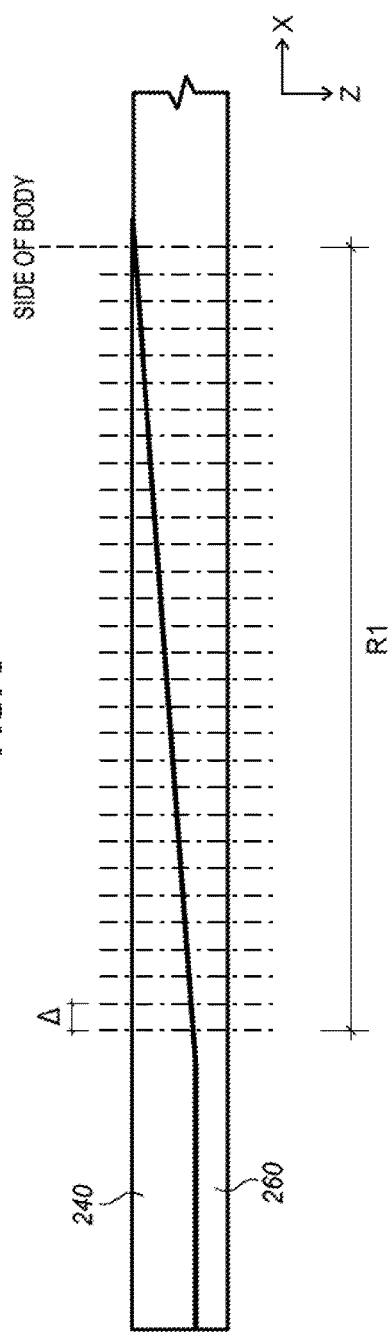

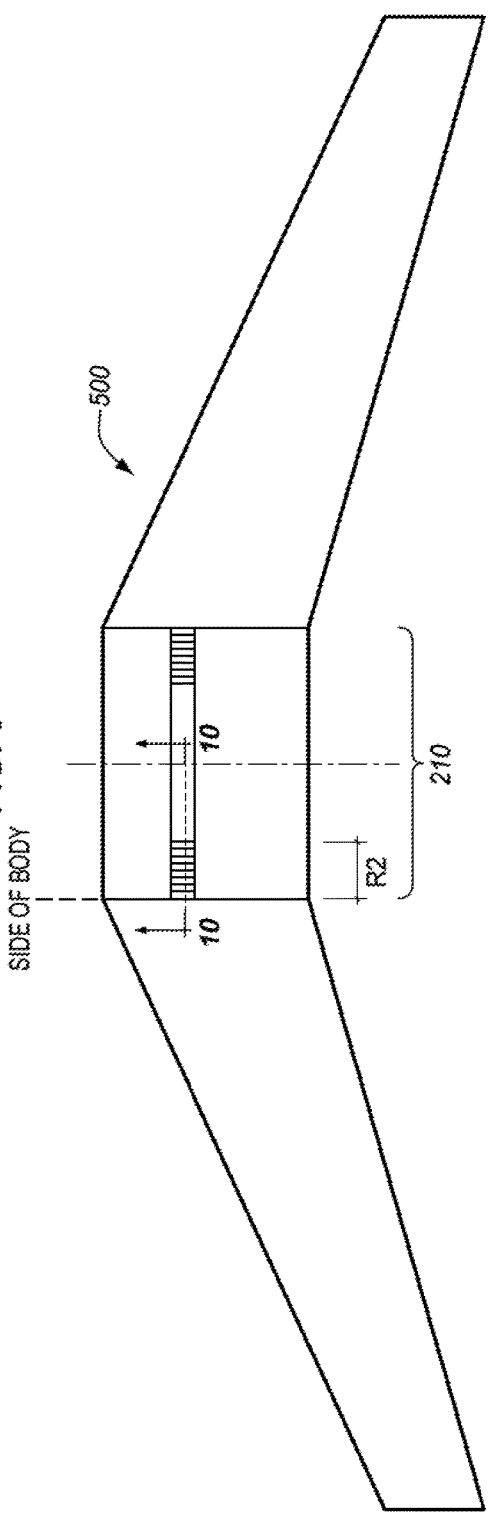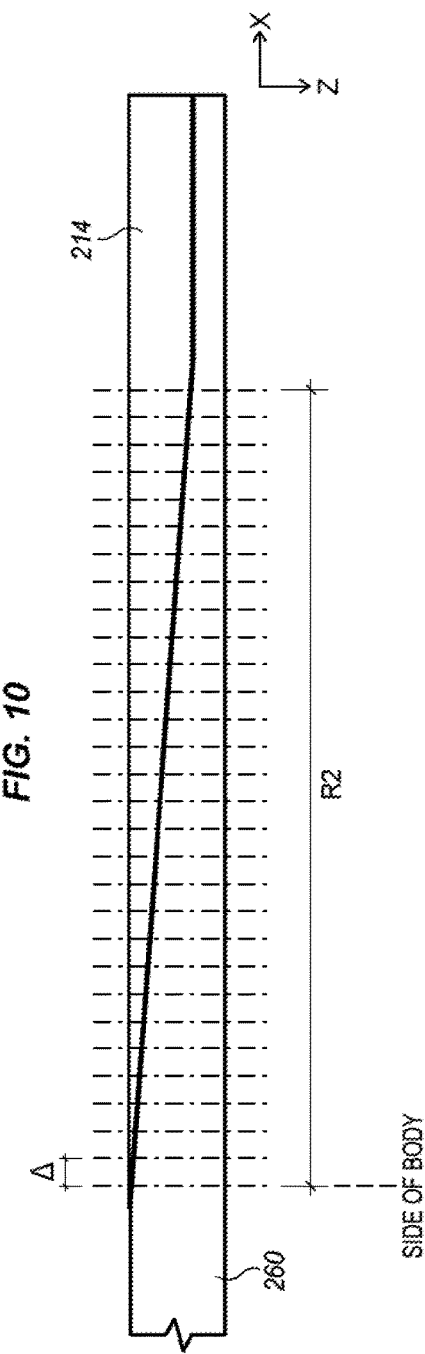

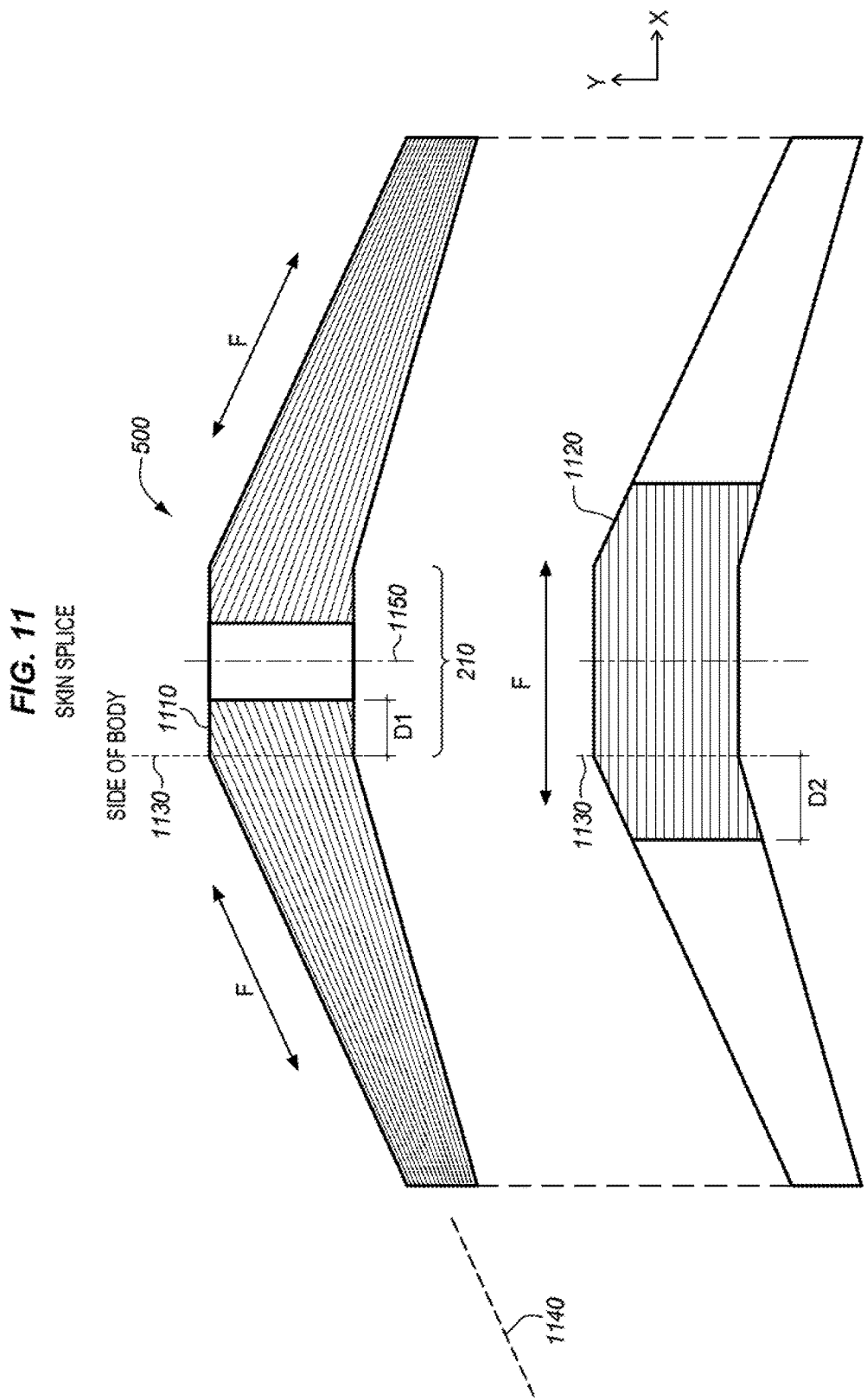

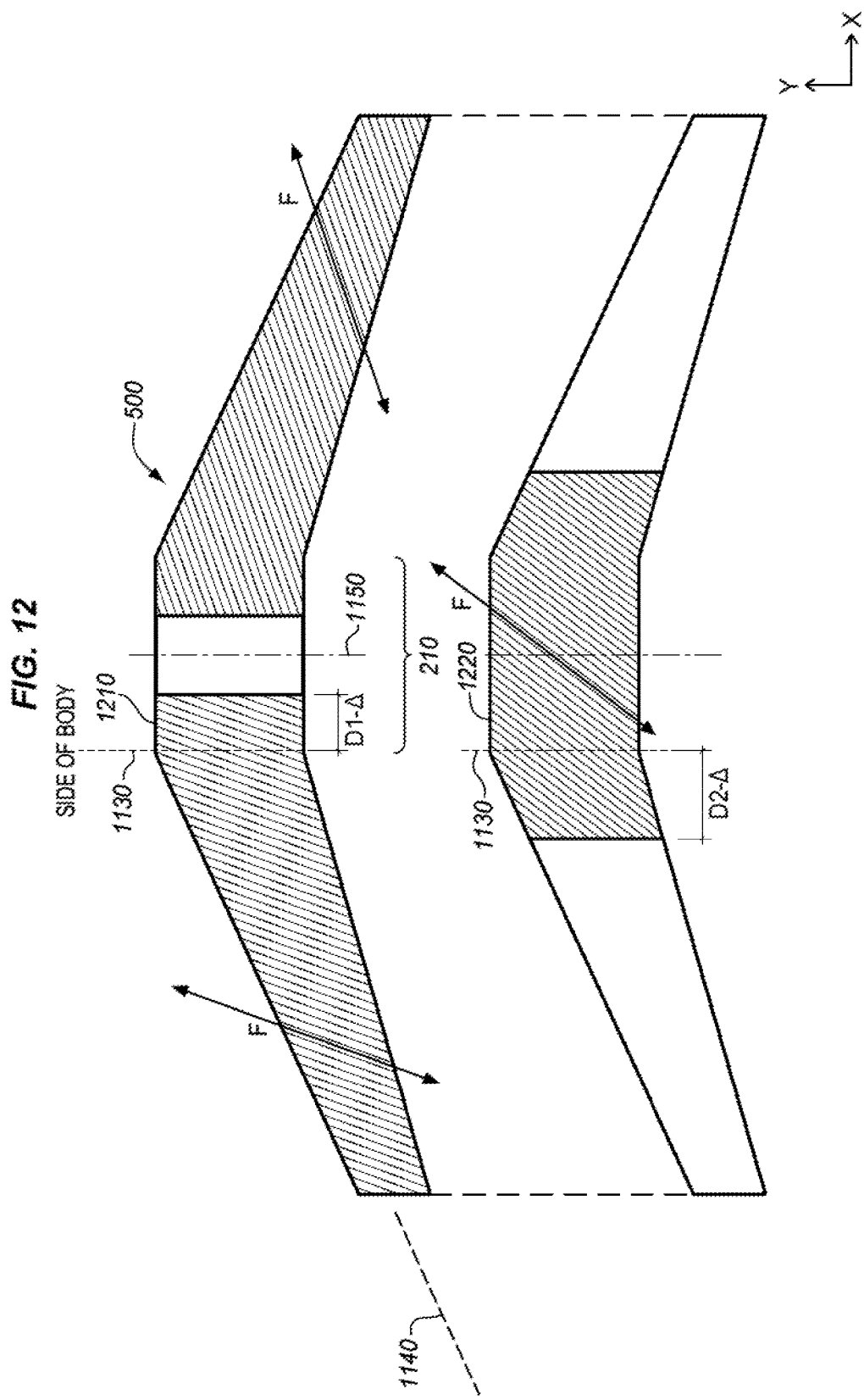

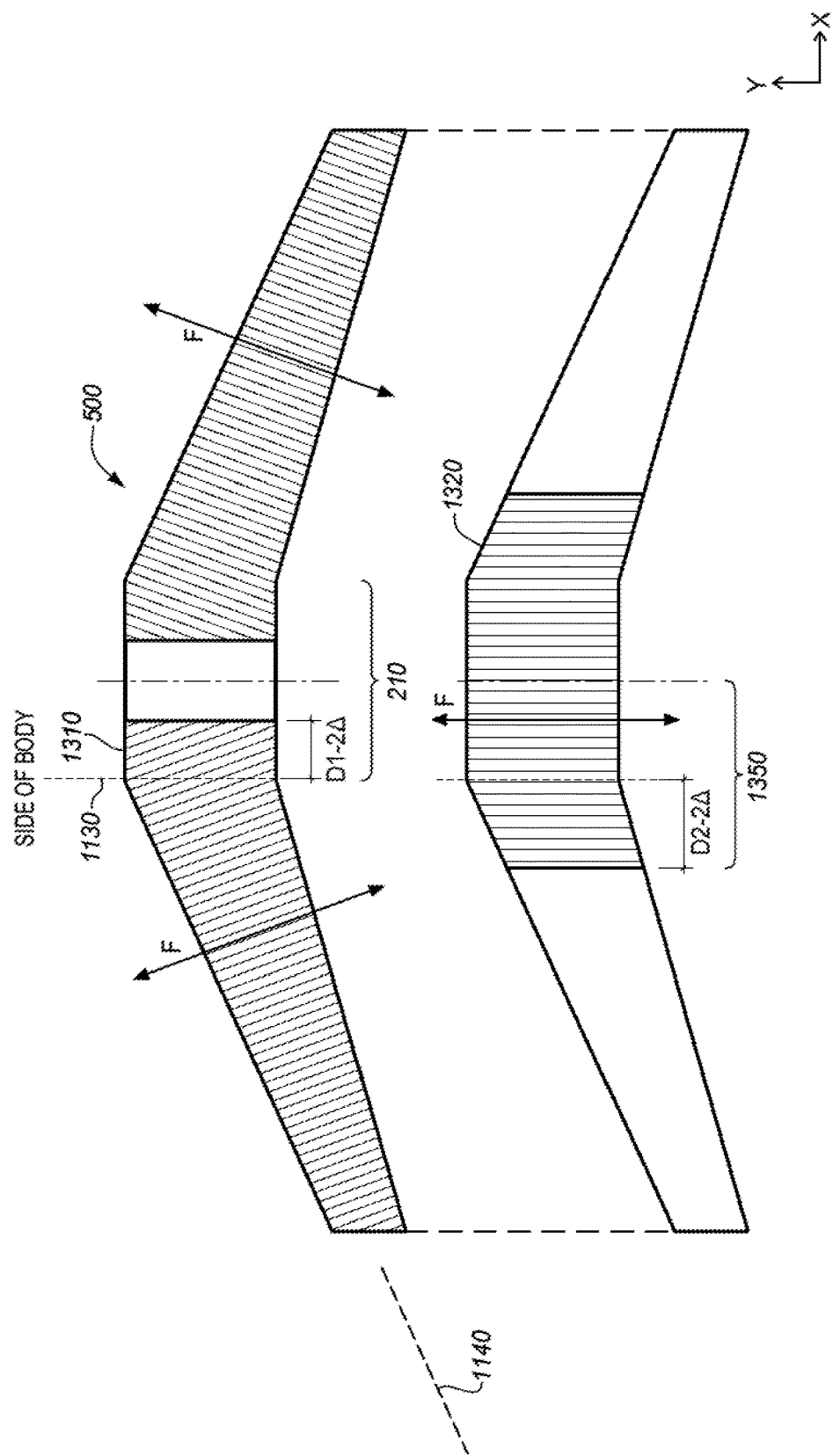

AIRCRAFT COMPOSITE WINGBOX INTEGRATION

FIELD

The disclosure relates to the field of aircraft, and in particular, to structural components of an aircraft wing.

BACKGROUND

The structural components of an aircraft wing withstand a variety of forces during flight, takeoff, and landing. These structural components are also designed to meet a large number of requirements (e.g., bird strike, lightning strike, air loads, ground loads, fuel pressure, etc.), and meeting these requirements while conforming with cost and manufacturing constraints remains a complicated process.

There are a wide variety of techniques and designs for building aircraft wings. In particular, designs for wings that utilize composite parts have become popular because these designs reduce weight and increase strength. However, composite aircraft wings remain complex to model and expensive to test. To meet all the aforementioned requirements, engineers prefer to design composite parts that substantially adhere to existing designs for metallic wing parts. However, doing so does not take full advantage of the composite materials. For example, metal designs utilize a large number of fastened components. In composite designs, the components could be integrated into a single, cheaper lighter design, such as a unitized/monolithic design.

SUMMARY

Examples described herein provide for designs that integrate many composite components of an aircraft wing box into a unified composite part (e.g., an upper panel of a wing box, comprising outboard sections and a center section). Specifically, plank-shaped stringers ("planked stringers") that structurally support an outboard section of a wing box are disposed such that their layers extend varying distances along the skin towards a center section of a wing box. This ensures that planked stringers in the outboard section integrate into the skin in a manner that ensures sufficient strength. Meanwhile, planked stringers that structurally support a center section are disposed such that their layers extend varying distances towards the outboard sections of the wing box. Layers of skin for an outboard section alternatingly overlap layers of skin for the center section to form a "pad up" portion of skin proximate to a side of body intersection of the aircraft. This enhances the strength of the skin near the intersection.

One example is a system that includes outboard planked stringers that are laterally oriented within an outboard section of a wing box and are co-cured with composite skin at the outboard section. Each outboard planked stringer includes planar layers of Carbon Fiber Reinforced Polymer (CFRP) that are parallel with the composite skin, have fiber orientations aligned to bear tension and compression applied to the wing box, and each extend a different distance along the composite skin at the outboard section towards a center section of the wing box. The system also includes center planked stringers that are laterally oriented within the center section and are co-cured with composite skin at the center section. Each center planked stringer includes planar layers of CFRP that are parallel with the skin, have fiber orientations aligned to bear tension and compression applied to the wing box, and each extend a different distance along the composite skin at the center section towards the outboard section.

Another example is a method. The method includes laying up outboard planked stringers that are laterally oriented within an outboard section of a wing box, each outboard planked stringer including planar layers of Carbon Fiber Reinforced Polymer (CFRP) that are parallel with composite skin at the outboard section, have fiber orientations aligned to bear tension and compression applied to the wing, and each extend a different distance along the composite skin at the outboard section towards a center section of the wing. The method also includes laying up center planked stringers that are laterally oriented within the center section of the wing, each planked stringer including planar layers of CFRP that are parallel with composite skin at the center section, have fiber orientations aligned to bear tension and compression applied to the wing, and each extend a different distance along the composite skin at the center section towards the outboard section of the wing. Further, the method includes co-curing the outboard planked stringers to the composite skin at the outboard section and co-curing the center planked stringers to the composite skin at the center section.

Other exemplary examples (e.g., methods and computer-readable media relating to the foregoing examples) may be described below. The features, functions, and advantages that have been discussed can be achieved independently in various examples or may be combined in yet other examples further details of which can be seen with reference to the following description and drawings.

DESCRIPTION OF THE DRAWINGS

Some examples of the present disclosure are now described, by way of example only, and with reference to the accompanying drawings. The same reference number represents the same element or the same type of element on all drawings.

FIG. 2 is a diagram of a portion of a wing box of an aircraft in an exemplary embodiment.

FIG. 3 is a top view of a planked stringer in an exemplary embodiment.

FIG. 4 is a diagram of a cross section of a planked stringer, including individual layers of composite material for the planked stringer in an exemplary embodiment.

FIG. 5 is a diagram illustrating an outboard portion of a planked stringer connected to a center portion of planked stringer, utilizing an overlap method in an exemplary embodiment.

FIG. 6 is a diagram illustrating a cross section of a connection between planked stringers utilizing an overlap method in an exemplary embodiment.

FIG. 7 is a diagram illustrating a top view of a wing box in an exemplary embodiment.

FIG. 8 is a diagram illustrating a cross-section of an intersection of an outboard section of a planked stringer with skin in an exemplary embodiment.

FIG. 9 is a diagram illustrating a further top view of a wing box in an exemplary embodiment.

FIG. 10 is a diagram illustrating a cross-section of an intersection of a planked stringer at an outboard section with skin in an exemplary embodiment.

FIG. 11 is a diagram illustrating a first portion of a pad-up between sections of skin in an exemplary embodiment.

FIG. 12 is a diagram illustrating a second portion of a thickening pad-up between sections of skin in an exemplary embodiment.

FIG. 13 is a diagram illustrating a third portion of a thickening pad-up between sections of skin in an exemplary embodiment.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
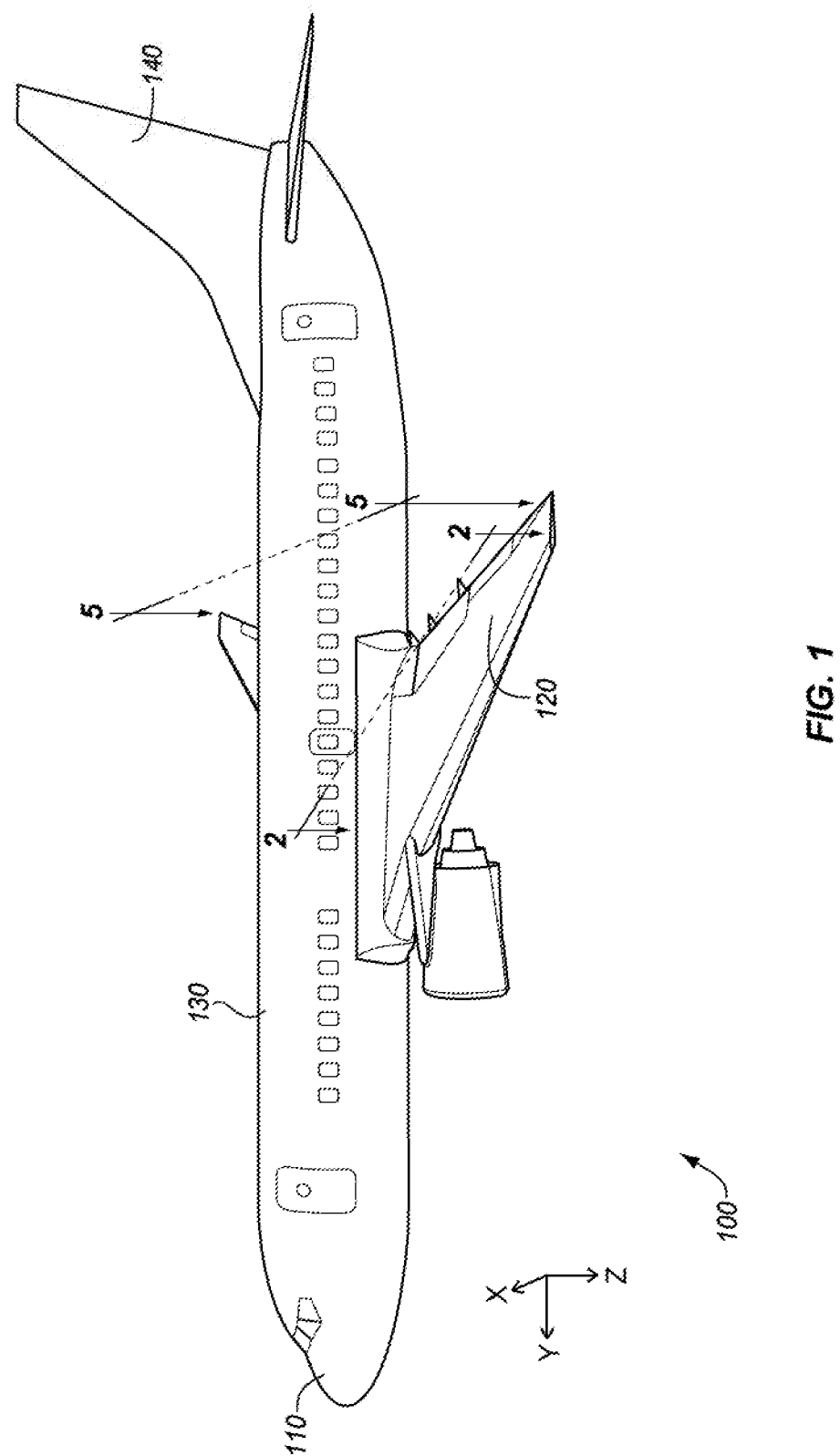
FIG. 1 is a diagram of an aircraft in an exemplary embodiment.

FIG. 1 is a perspective view of aircraft 100. As shown in FIG. 1, aircraft 100 includes nose 110, outboard sections 120 (also referred to as "outer wing sections"), fuselage 130, and tail 140. FIG. 2 is a diagram of an outboard section 120 in an exemplary embodiment. Specifically, FIG. 2 is a top view indicated by view arrows 2 of FIG. 1. According to FIG. 2, outboard section 120 is physically attached to center section 210, which couples outboard section 120 to another outboard section 120 in order to form wing box 500. In this example, wing box 500 includes skin 260. Skin 260 may comprise a multi-layer cured composite material such as Carbon Fiber Reinforced Polymer (CFRP), having a total thickness for example between about 0.15 and 0.6 inches (e.g., between about 30-100 layers). In one example, a majority of the layers of skin 260 have fiber orientations that bear shear stresses along outer wing sections 120 (e.g., fiber orientations of +/−45°). Skin 260 surrounds outboard section 120, and defines an internal volume in which planked stringers 240 are disposed.

Planked stringers 240 are laterally oriented within outboard section 120 (that is, planked stringers 240 run laterally/lengthwise as they continue along outboard section 120 towards wing tip 122). As outboard section 120 extends outward towards wing tip 122, the number of planked stringers 240 disposed from fore to aft along outboard section 120 may reduce in number. Planked stringers 240 may, for example, terminate at supports 250. Planked stringers 240 comprise multi-layer composite parts (e.g., similar to those described above for skin 260) which are co-cured to skin 260. However, planked stringers 240 are thicker than skin 260 (e.g., an inch of thickness owing to a greater number of layers in each planked stringer 240), and a majority of the layers of each planked stringer 240 have fiber orientations that bear bending along outboard section 120 (e.g., fiber orientations of 0°). FIG. 2 further illustrates front spar 220 and rear spar 230. Additional components (e.g., spars, etc.) may be utilized to structurally support planked stringers 240 within outboard section 120 and prevent buckling.

With the placement of planked stringers 240 within outboard section 120 illustrated in the prior figures, FIGS. 3-4 are next provided to illustrate an exemplary planked stringer isolated from other elements of aircraft 100. Specifically, FIGS. 3-4 are diagrams illustrating geometry of a planked stringer 240 in an exemplary embodiment. As shown in FIG. 3 (a top view), planked stringer 240 has a length L extending in the X direction laterally across outboard section 120, and planked stringer 240 further has a width W extending in the Y direction from fore to aft. Each layer of planked stringer 240 has a fiber orientation varying from 0° to 90°. In this example, a majority of layers of planked stringer 240 have a fiber orientation of 0°. This combination of fiber orientations increases the ability of planked stringer 240 to bear bending loads (e.g., tension and compression) at outboard section 120 as wing tip 122 deflects during flight. Planked stringer 240 may taper off in thickness (T) as planked stringer 240 extends from region 246 to 248. Furthermore, planked stringer 240 may taper off in thickness along its width in regions 244.

FIG. 4 illustrates a cross section view of planked stringer 240, corresponding to a slice of planked stringer 240 in a vertical plane extending from fore to aft. Specifically, FIG. 4 illustrates a view corresponding to view arrows 4 of FIG. 3. As shown in FIG. 4, cross sections of planked stringer 240 are quadrilateral. Furthermore, cross sections of planked stringer 240 do not include slopes from fore to aft that are greater in magnitude than forty five degrees, and the cross sections do not include overhangs. Thus, planked stringer 240 lays flat against skin 260 without any vertical projections. FIG. 4 further illustrates that planked stringer 240 has a thickness T, and a thickness of an individual layer $T_L$. The width of planked stringer 240 decreases from a base/bottom layer 460 directly co-cured to skin 260, to a top layer 840. As shown in FIG. 4, in this example a ratio of width to thickness at planked stringer 240 does not exceed ten. Furthermore, in this example each layer of planked stringer 240 is planar (e.g., having a substantially planar shape), and each layer of planked stringer 240 is parallel with skin 260 (e.g., a planar layer of skin 260). This does not, however, mean that the fiber orientations within the layers of planked stringer 240 and skin 260 are the same.

FIG. 5 is a diagram illustrating a planked stringer 240 of outboard section 120 ("outboard planked stringer") connected with a planked stringer 214 of center section 210 ("center planked stringer") in an exemplary embodiment. Wing box 500 of FIG. 5, comprising the structural portion located between a leading edge and a trailing edge of the wings, is also illustrated. Wing box 500 includes both outboard sections 120 as well as center section 210. Co-curing planked stringer 240 to planked stringer 214 increases the strength of the interface between outboard section 120 and center section 210, ensuring structural integrity. FIG. 6 illustrates one potential technique for laying the entire thickness of planked stringer 214 up over top of planked stringer 240. The two planked stringers may then be co-cured. However, this solution is non-optimal because it may result in a reduced load transfer area corresponding to region 620, a ramp angle of region 630 may result in a potential dis-bond between planked stringer 240 and planked stringer 214, and midline 610 may experience too much deformation, increasing the chance of wrinkles or other imperfections. Thus, further techniques are discussed below that focus on integrating planked stringers 240 with skin 260 in order to form a single integral, monolithic composite upper panel for wing box 500. Using these techniques, planked stringers 214 and 240 do not need to be directly co-cured with each other, but rather may be separately co-cured to skin 260 without being placed directly into contact with each other. In short, skin 260 may mechanically couple planked stringers 214 and 240. This facilitates the fabrication of planked stringers 214 and 240 with skin 260 into a combined, monolithic upper panel for wing box 500.

FIGS. 7-10 are diagrams illustrating an enhanced technique for co-curing planked stringers to skin in order to form an integral, monolithic composite part (e.g., an integral upper panel of wing box 500) in an exemplary embodiment. In FIGS. 7-8, in region R1 planked stringer 240 extends along skin 260 towards center section 210. This may be accomplished without substantially increasing the thickness of skin 260 and planked stringers 240, while still achieving a large load transfer area between skin 260 and planked stringer 240. Specifically, planked stringer 240 is laid-up such that its individual layers each extend a different distance along skin 260 towards center section 210. For example, neighboring layers of planked stringer 240 may each extend further along skin 260 by some incremental amount Δ. To reiterate, the overlap amount changes between layers, and the layers extend by an incrementally changing amount of overlap. In this manner, planked stringer 240 gradually integrates with skin 260, ensuring that region R1 is a large area for bearing load. In a similar fashion, some layers of skin 260 may extend different lengths along planked stringer 240, in order to account for the increase in thickness caused by overlapping layers of planked stringer 240. Skin 260 and planked stringer 240 are co-cured in region R1 (i.e., they are laid-up together and then cured to form a single integral part). FIGS. 9-10 illustrate a further co-curing arrangement, in which a planked stringer 214 of center section 210 is attached to skin 260 in region R2 within center section 210 via similar techniques to those discussed above. In the examples discussed above, planked stringer 240 may taper down significantly (e.g., between about 40 to about 100% reduction in gage) as planked stringer 240 approaches a side of body of aircraft 100 in region R1, and planked stringer 214 may taper down a similar amount as planked stringer 214 approaches the side of body of aircraft 100 in region R2. Using such techniques, the side of body of aircraft 100 remains fairly smooth, since the planks have been reduced in size (e.g., to practically zero thickness). The taper ramp rates (e.g., the ratio of extension to decrease in thickness) on the planked stringers (and, for example, the skin to which they are co-cured) range anywhere from 2000:1 to 10:1. For example, a taper ramp rate of 100:1 may be ideal in examples where concerns regarding strength, weight, bond line stress, and manufacturability are taken into account.

Utilizing the planked stringer-to-skin co-curing discussed above, structural components of a center section may be integrated with an outboard section in a manner that ensures desired structural strength. Furthermore, the techniques provided herein ensure that layup of structural components within outboard section 120 and center section 210 remains an efficient and straightforward process. With a discussion of the co-curing of planked stringers to skin completed, the following figures and diagrams now focus on describing a thickening pad-up of skin 260 proximate to a side of body intersection of aircraft 100.

FIGS. 11-14 are diagrams illustrating an enhanced technique for connecting sections of skin in an exemplary example. In particular, these FIGS. illustrate ongoing layup of layers of skin 260 along outboard section 120 (e.g., skin 260 corresponding to outboard section 120) and skin 260 along center section 210 (e.g., skin 260 corresponding to center section 210). As shown in FIG. 11, layer 1110 of skin 260 of outboard section 120 protrudes a distance D1 past a side of body intersection 1130 into center section 210. Meanwhile, a layer 1120 of skin 260 of center section 210 protrudes a distance D2 beyond side of body intersection 1130 into outboard section 120. As shown in FIG. 11, the fiber orientation (F) of layers 1110 and 1120 is zero degrees, corresponding with wing axis 1140. The process continues in FIG. 12, wherein an additional layer 1210 of skin 260 of outboard section 120 is laid-up onto layer 1110. Layer 1210 protrudes a distance D1-Δ past a side of body intersection 1130 into center section 210. Furthermore, a layer 1220 of skin 260 of center section 210 is laid-up onto layer 1120. Layer 1220 protrudes into region D2-Δ beyond side of body intersection 1130 into outboard section 120. In this example, the fiber orientation (F) of layers 1210 and 1220 is forty five degrees. The process further continues in FIG. 13, wherein an additional layer 1310 of skin 260 of outboard section 120 is laid-up onto layer 1210. Layer 1310 protrudes a distance D1-2Δ past a side of body intersection 1130 into center section 210. Meanwhile, a layer 1320 of skin 260 of center section 210 is laid-up onto layer 1220. Layer 1320 protrudes into region D2-2Δ beyond side of body intersection 1130 into outboard section 120. The fiber orientation (F) of layers 1310 and 1320 is ninety degrees, corresponding with body axis 1150.

The layup process may continue in this manner, resulting in varied fiber orientations for individual layers of skin 260, until there is no protrusion of layers from center section 210 into outboard section 120, and vice versa. That is, as layers of skin 260 continue to be laid-up and alternatingly gradually overlap each other shorter and shorter distances, skin 260 builds up to form a thickening "pad-up" region 1350. Thus, skin 260 thickens (i.e., a skin thickness of the composite skin changes) in the thickening pad-up region 1350 (e.g., significantly, such as between 20 and 200% gage) as the side of body intersection 1130 is approached. This results in a multi-directional layup (e.g., including a variety of fiber orientations/angles) at the side of body intersection 1130, including fiber/ply angles that follow wing axis 1140, and fiber/ply angles that follow body axis 1150. As used herein, an "overlap" refers to a layer of CFRP extending over another layer of CFRP in a manner that at least partially obscures the underlying layer. This overlap technique enables skin 260 within thickening pad-up region 1350 to bear increased loads expected proximate to side of body intersection 1130. As used herein, the phrase "alternatingly overlap" refers to a layer of skin 260 from outer wing section 120 overlapping a layer of skin 260 from center section 210, and then being overlapped by a layer of skin 260 from center section 210, and so on in alternating fashion. Utilizing a thickening pad-up region of thicker skin provides a substantial benefit to aircraft 100, because it re-directs changes in load direction as the side of body region is traversed from the wing axis to the body axis.

Figure 14:
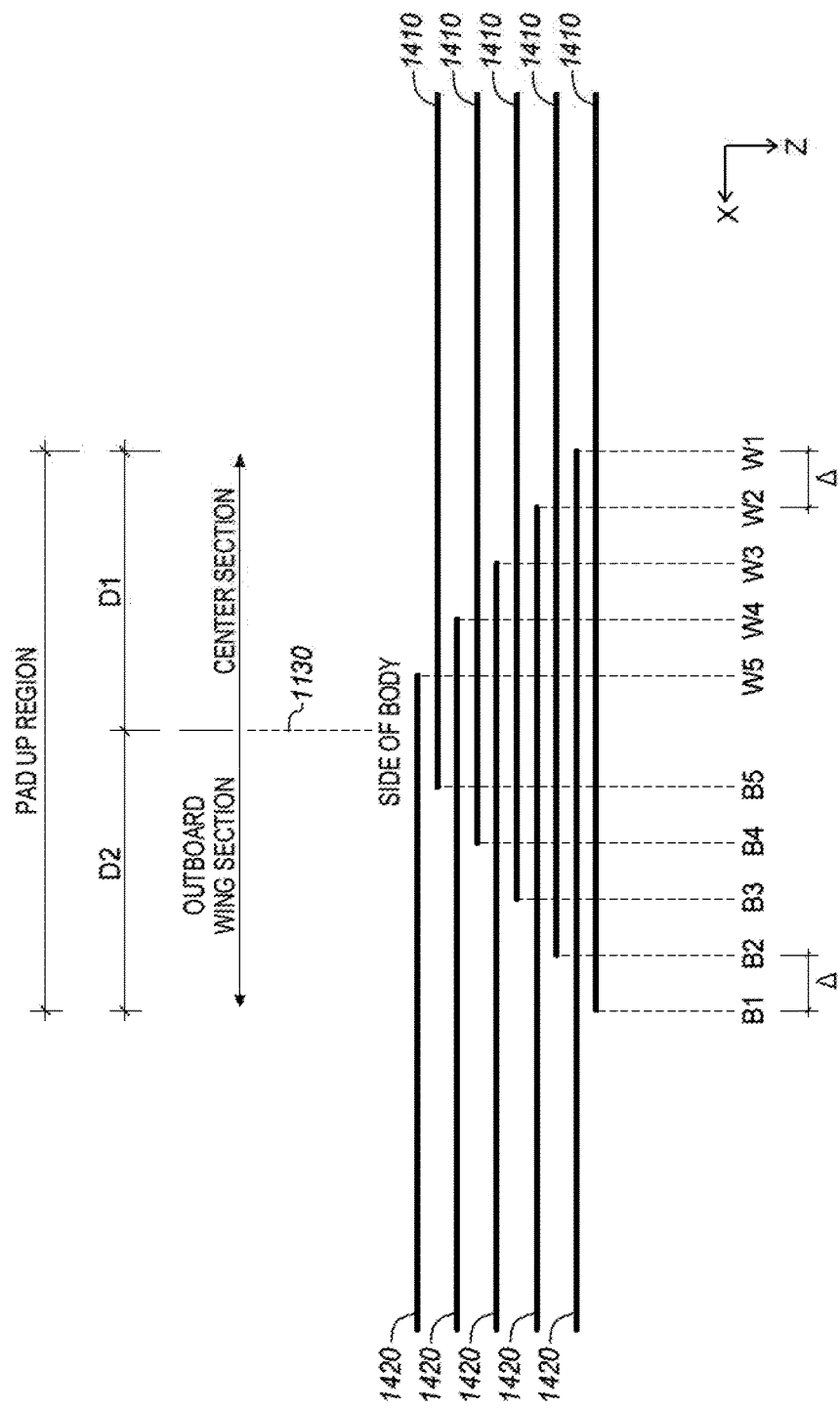
FIG. 14 is a diagram illustrating a cross section of a thickening pad-up of skin in an exemplary embodiment.

FIG. 14 is a conceptual diagram of a thickening pad-up of overlapping sections of skin in an exemplary embodiment. As shown in FIG. 14, the pad up region protrudes partially into center section 210, and partially into outboard section 120.

According to FIG. 14, layers 1420 of skin 260 at outer wing section 120 extend from left to right across side of body intersection 1130 by varying amounts. Adjacent layers 1420 vary in the amount they extend into center section 210 by an incremental amount Δ. Thus, as shown in FIG. 14, a top layer 1420 extends to a point W5, while a bottom layer 1420 extends to a point W1. Similarly, layers 1410 of skin 260 at center section 210 extend from right to left across side of body intersection 1130 by varying amounts. Adjacent layers 1410 vary in the amount they extend into outer wing section 120 by Δ. Thus, as shown in FIG. 14, a top layer 1410 extends to a point B5, while a bottom layer 1420 extends to a point B1. In this manner, layers of skin 260 from outer wing section 120 and center section 210 gradually build up to form a thickening pad-up section exhibiting increased strength.

Figure 15:
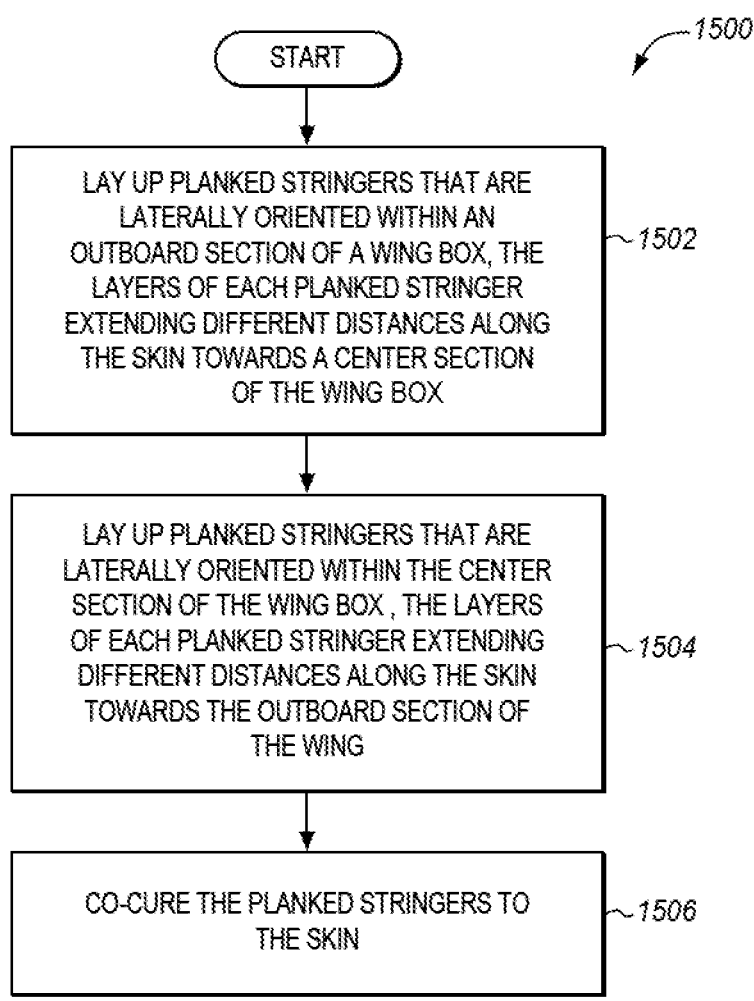
FIG. 15 is a flowchart illustrating a method of laying up components of an aircraft in an exemplary embodiment.

Illustrative details of the fabrication of an intersection of skin between outer wing section 120 and center section 210 will be discussed with regard to FIG. 15. Assume, for this example, that an operator wishes to fabricate a combined, integral monolithic composite part comprising both outer wing sections 120 and center section 210. FIG. 15 is a flowchart illustrating a method 1500 for laying up components of an aircraft in an exemplary embodiment. The steps of method 1500 are described with reference to aircraft 100 of FIG. 1, but those skilled in the art will appreciate that method 1500 may be performed in other systems. The steps of the flowcharts described herein are not all inclusive and may include other steps not shown. The steps described herein may also be performed in an alternative order.

According to FIG. 15, planked stringers 240 are laid-up within an outboard section 120 of wing box 500 such that the planked stringers 240 are laterally oriented within the outboard section (i.e., such that the planked stringers 240 run along the length of the outboard section) (step 1502). As laid-up, each layer of each of the planked stringers 240 extends a different distance along skin 260 towards center section 210. This process may be performed, for example, by an Automated Fiber Placement (AFP) machine. Additionally according to the method, planked stringers 214 are laid-up within a center section 210 of wing box 500 such that the planked stringers 214 are laterally oriented within center section 210 (i.e., such that the planked stringers run along the length of the center section) (step 1504). As laid-up, each layer of each of the planked stringers 214 extends a different distance along skin 260 towards an outboard section 120. Steps 1502 and 1504 may occur, for example, concurrently as outboard section 120 and center section 210 are fabricated together. Alternatively, planked stringers 240 and 214 may be separately laid-up, and then transported to outboard section 120 and center section 210 for co-curing to skin 260. With planked stringers 240 and 214 positioned in a desired location, the planked stringers 240 and 214 are co-cured to skin 260 (step 1506). This may be performed as a single step, for example by placing the entirety of wing box 500 (or an upper panel thereof) into an autoclave.

Utilizing the method described above, structural components at outboard section 120 and center section 210 may be beneficially integrated with/co-cured with each other in a manner that creates a single monolithic integrated composite part having sufficient strength for flight.

EXAMPLES

In the following examples, additional processes, systems, and methods are described in the context of integrating planked stringers and/or sections of skin between a wing and a center section.

Figure 16:
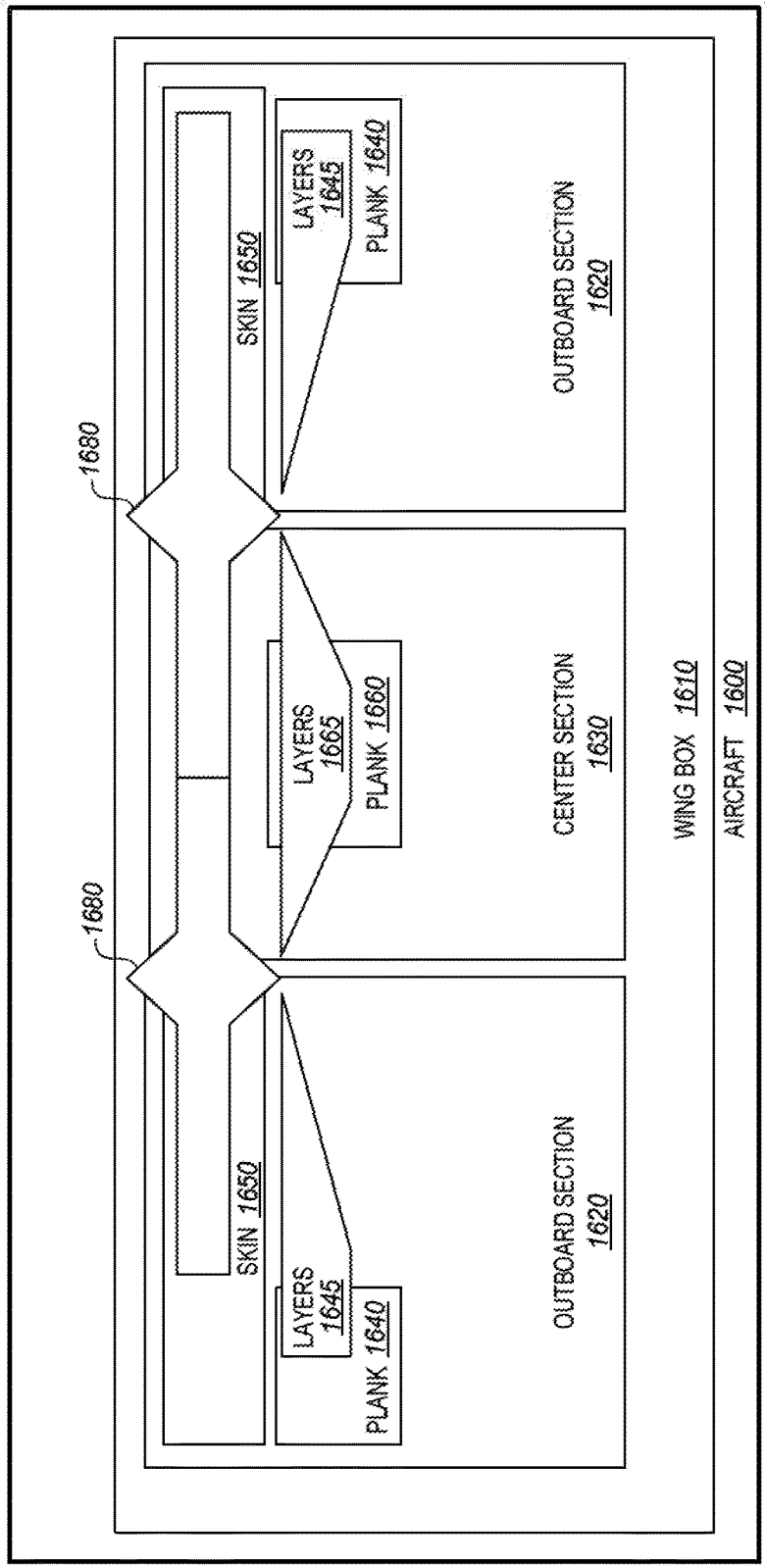
FIG. 16 is a block diagram of an aircraft in an exemplary embodiment.

FIG. 16 is a block diagram of an aircraft 1600 in an exemplary embodiment. In this example, aircraft 1600 includes wing box 1610, which includes outboard sections 1620 and center section 1630. Each outboard section 1620 comprises planked stringers ("planks") 1640. Each plank 1640 comprises multiple layers 1645, which each extend a different distance along center section 1630. Meanwhile, center section 1630 includes skin 1650, as well as plank 1660. Each layer 1665 of a planked stringer 1660 extends a different distance towards an outboard section 1620. Thickening pad-ups 1680 of skin 1650 are also illustrated.

Figure 17:
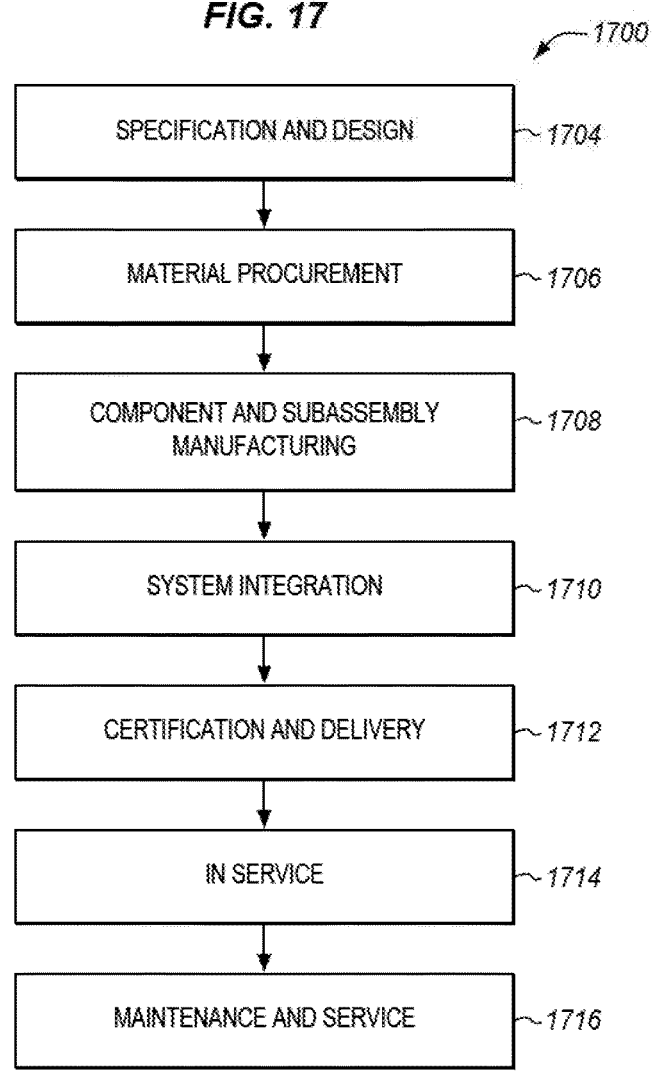
FIG. 17 is a flow diagram of aircraft production and service methodology in an exemplary embodiment.
Figure 18:
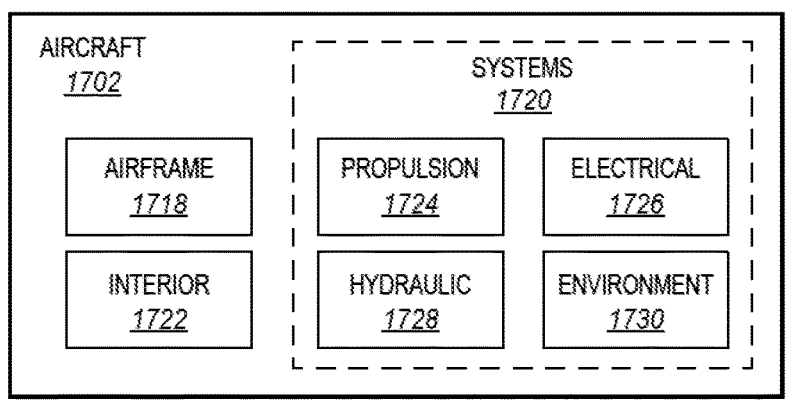
FIG. 18 is a block diagram of an aircraft in an exemplary embodiment.

Referring more particularly to the drawings, embodiments/examples of the disclosure may be described in the context of an aircraft manufacturing and service method 1700 as shown in FIG. 17 and an aircraft 1702 as shown in FIG. 18. During pre-production, exemplary method 1700 may include specification and design 1704 of the aircraft 1702 and material procurement 1706. During production, component and subassembly manufacturing 1708 and system integration 1710 of the aircraft 1702 takes place. Thereafter, the aircraft 1702 may go through certification and delivery 1712 in order to be placed in service 1714. While in service by a customer, the aircraft 1702 is scheduled for routine maintenance and service 1716 (which may also include modification, reconfiguration, refurbishment, and so on).

Each of the processes of method 1700 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 18, the aircraft 1702 produced by exemplary method 1700 may include an airframe 1718 with a plurality of systems 1720 and an interior 1722. Examples of high-level systems 1720 include one or more of a propulsion system 1724, an electrical system 1726, a hydraulic system 1728, and an environmental system 1730. Any number of other systems may be included. Although an aerospace example is shown, the principles of the disclosure may be applied to other industries, such as the automotive industry.

Apparatus and methods embodied herein may be employed during any one or more of the stages of the production and service method 1700. For example, components or subassemblies corresponding to production stage 1708 may be fabricated or manufactured in a manner similar to components or subassemblies produced while the aircraft 1702 is in service. Also, one or more apparatus embodiments, method embodiments, or a combination thereof may be utilized during the production stages 1708 and 1710, for example, by substantially expediting assembly of or reducing the cost of an aircraft 1702. Similarly, one or more of apparatus embodiments, method embodiments, or a combination thereof may be utilized while the aircraft 1702 is in service, for example and without limitation, to maintenance and service 1716. For example, the techniques and systems described herein may be used for steps 1706, 1708, 1710, 1714, and/or 1716, and/or may be used for airframe 1718 and/or interior 1722. These techniques and systems may even be utilized for systems 1720, including for example propulsion 1724, electrical 1726, hydraulic 1728, and/or environmental 1730.

In one example, outboard section 120 and center section 210 are portions of airframe 118, and are manufactured during component and subassembly manufacturing 1708. Outboard section 120 and center section 210 may be co-cured into a unified panel of wing box 500, and then combined with other components in system integration 1710, followed by being utilized in service 1714. Then, in maintenance and service 1716, an integrated composite upper panel made of outboard section 120 and center section 210 may be repaired and/or refurbished as needed.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

The invention claimed is:

1. A system comprising:
outboard planked stringers that are laterally oriented within an outboard section of a wing box and are co-cured with composite skin at the outboard section,
each outboard planked stringer includes planar layers of Carbon Fiber Reinforced Polymer (CFRP) that are parallel with the composite skin at the outboard section, have fiber orientations aligned to bear tension and compression applied to the wing box, and each extend a different distance along the composite skin at the outboard section towards a center section of the wing box, resulting in a decrease in thickness of each outboard planked stringer, and
center planked stringers that are laterally oriented within the center section and are co-cured with composite skin at the center section,
each planked stringer of the center section includes planar layers of CFRP that are parallel with the composite skin at the center section, have fiber orientations aligned to bear tension and compression applied to the wing box, and each extend a different distance along the composite skin at the center section towards the outboard section,
wherein the composite skin increases in thickness by an amount corresponding to the decrease in thickness of each outboard planked stringer, causing a combined thickness of the skin and each outboard planked stringer to remain unchanged throughout the outboard section.

2. The system of claim 1 further comprising:
the composite skin at the outboard section, comprising layers of CFRP having fiber orientations aligned to bear shear stresses applied to the wing box, wherein
proximate to a side of body intersection between the outboard section and the center section, layers of the composite skin at the outboard section are alternatingly overlapped with layers of the composite skin at the center section, resulting in a thickening pad-up of composite skin proximate to the side of body intersection, the thickening pad-up redirecting changes in load direction as forces are transmitted from a wing axis to a body axis.

3. The system of claim 2 wherein:
each layer of the composite skin at the outboard section overlaps a layer of the composite skin at the center section by a different amount, resulting in an incrementally changing amount of overlap as distance to the side of body intersection changes.

4. The system of claim 2 wherein:
the thickening pad-up of composite skin results from an increase in a number of layers of composite skin proximate to the side of body intersection, increasing skin thickness between twenty and two hundred percent gage at the thickening pad-up.

5. The system of claim 2 wherein:
the thickening pad-up of composite skin proximate to the side of body intersection includes layers having fiber orientations that follow a wing axis of an aircraft, and layers having fiber orientations that follow a body axis of the aircraft.

6. The system of claim 1 wherein:
a thickness of each of the outboard planked stringers tapers down between forty and one hundred percent as the planked stringer extends towards a side of body intersection between the outboard section and the center section.

7. The system of claim 6 wherein:
a combination of the outboard planked stringers and the composite skin at the outboard section tapers down at a ramp rate between 2000:1 and 10:1.

8. The system of claim 7 wherein:
the combination of the outboard planked stringers and the composite skin at the outboard section tapers down at a ramp rate of 100:1.

9. The system of claim 1 wherein:
the composite skin at the outboard section mechanically couples the outboard planked stringers to the center planked stringers.

10. The system of claim 1 wherein:
each outboard planked stringer is a different length.

11. The system of claim 1 wherein:
for each outboard planked stringer, adjacent layers extend incrementally different distances along the composite skin at the outboard section towards the center section.

12. A method comprising:
laying up outboard planked stringers that are laterally oriented within an outboard section of a wing box, each outboard planked stringer including planar layers of Carbon Fiber Reinforced Polymer (CFRP) that are parallel with composite skin at the outboard section, have fiber orientations aligned to bear tension and compression applied to a wing, and each extend a different distance along the composite skin at the outboard section towards a center section of the wing, resulting in a decrease in thickness of each outboard planked stringer;

laying up center planked stringers that are laterally oriented within the center section of the wing, each center planked stringer including planar layers of CFRP that are parallel with composite skin at the center section, have fiber orientations aligned to bear tension and compression applied to the wing, and each extend a different distance along the composite skin at the center section towards the outboard section of the wing; and co-curing the outboard planked stringers to the composite skin at the outboard section, and center planked stringers to the composite skin at the center section, wherein the composite skin increases in thickness by an amount corresponding to the decrease in thickness of each outboard planked stringer, causing a combined thickness of the skin and each outboard planked stringer to remain unchanged throughout the outboard section.

13. The method of claim 12 further comprising:

laying up the composite skin at the outboard section and the composite skin at the center section, wherein laying up comprises alternatingly overlapping, proximate to a side of body intersection between the outboard section and the center section, layers of the composite skin at the center section and layers of the composite skin at the outboard section, resulting in a thickening pad-up of composite skin proximate to the side of body intersection, the thickening pad-up redirecting changes in load direction as forces are transmitted from a wing axis to a body axis.

14. The method of claim 13 wherein:

laying up comprises adjusting an overlap amount with each layer of the composite skin at the outboard section and each layer of the composite skin at the center section, resulting in an incrementally changing amount of overlap as distance to the side of body intersection changes.

15. The method of claim 13 wherein:

the thickening pad-up of composite skin results from an increase in a number of layers of composite skin proximate to the side of body intersection, increasing skin thickness between twenty and two hundred percent gage at the thickening pad-up.

16. The method of claim 13 wherein:

laying up includes laying up layers of composite skin having fiber orientations that follow a wing axis of an aircraft, and laying up layers of composite skin having fiber orientations that follow a body axis of the aircraft.

17. The method of claim 12 wherein:

laying up the outboard planked stringers comprises tapering down a thickness of each outboard planked stringer between forty and one hundred percent as the outboard planked stringer extends towards a side of body intersection between the outboard section and the center section.

18. The method of claim 17 wherein:

a combination of the outboard planked stringers and the composite skin at the outboard section tapers down at a ramp rate between 2000:1 and 10:1.

19. The method of claim 18 wherein:

the combination of the outboard planked stringers and the composite skin at the outboard section tapers down at a ramp rate of 100:1.

20. The method of claim 12 wherein:

the composite skin at the outboard section mechanically couples the outboard planked stringers to the center planked stringers.

* * * * *